United States Patent
Higashi et al.

(10) Patent No.: US 11,794,852 B2
(45) Date of Patent: Oct. 24, 2023

(54) ELECTRIC ASSISTED BICYCLE, DRIVE SYSTEM THEREOF, AND CONTROL METHOD

(71) Applicant: YAMAHA HATSUDOKI KABUSHIKI KAISHA, Iwata (JP)

(72) Inventors: Toshihiko Higashi, Shizuoka (JP); Yoichiro Hattori, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 555 days.

(21) Appl. No.: 17/128,421

(22) Filed: Dec. 21, 2020

(65) Prior Publication Data

US 2021/0197924 A1  Jul. 1, 2021

(30) Foreign Application Priority Data

Dec. 27, 2019 (JP) .................................. 2019-239467

(51) Int. Cl.
| | |
|---|---|
| *B62J 45/411* | (2020.01) |
| *B62M 6/50* | (2010.01) |
| *B62J 45/412* | (2020.01) |
| *B62J 45/413* | (2020.01) |
| *B62M 6/55* | (2010.01) |
| *B62M 9/06* | (2006.01) |

(52) U.S. Cl.
CPC .............. *B62M 6/50* (2013.01); *B62J 45/412* (2020.02); *B62J 45/413* (2020.02); *B62M 6/55* (2013.01); *B62M 9/06* (2013.01)

(58) Field of Classification Search
USPC .......................................................... 701/22
See application file for complete search history.

(56) References Cited

U.S. PATENT DOCUMENTS

| | | | | |
|---|---|---|---|---|
| 9,199,693 B2 * | 12/2015 | Arimune | ................... | B62M 6/45 |
| 10,246,161 B2 * | 4/2019 | Kinpara | ................... | B62M 6/55 |
| 10,538,246 B2 * | 1/2020 | Arai | ........................ | B60K 28/16 |

(Continued)

FOREIGN PATENT DOCUMENTS

| | | |
|---|---|---|
| EP | 2 705 973 B1 | 7/2018 |
| JP | 09-263290 A | 10/1997 |

(Continued)

*Primary Examiner* — Hunter B Lonsberry
*Assistant Examiner* — Robert Louis Pinkerton
(74) *Attorney, Agent, or Firm* — KEATING AND BENNETT, LLP

(57) ABSTRACT

In a drive system of an electric assisted bicycle, a controller includes a vehicle speed calculator to calculate a change gear ratio of a change gear mechanism based on an output signal of a vehicle speed sensor and an output signal of a rotation sensor in response to acquisition of the output signal of the vehicle speed sensor, and calculate a vehicle speed based on the calculated change gear ratio and the output signal of the rotation sensor at a higher frequency than a frequency of the acquisition of the output signal of the vehicle speed sensor. The controller includes an initial target calculator to calculate target power without using the output signal of the vehicle speed sensor in a prescribed period from start of walking, when a walk command is received, and a target calculator to calculate a target power based on the vehicle speed calculated by the vehicle speed calculator after a lapse of the prescribed period.

15 Claims, 10 Drawing Sheets

(56) References Cited

U.S. PATENT DOCUMENTS

| | | | | |
|---|---|---|---|---|
| 10,836,453 | B2* | 11/2020 | Tsuchizawa | F16H 61/66236 |
| 2013/0311019 | A1* | 11/2013 | Tanaka | B62M 6/45 |
| | | | | 701/22 |
| 2013/0317679 | A1* | 11/2013 | Tanaka | B60L 15/2009 |
| | | | | 701/22 |
| 2015/0367750 | A1* | 12/2015 | Takamoto | B62K 11/00 |
| | | | | 701/22 |
| 2016/0016638 | A1* | 1/2016 | Miyoshi | B62K 23/02 |
| | | | | 701/22 |
| 2017/0151998 | A1* | 6/2017 | Negoro | B62M 6/55 |
| 2019/0315433 | A1* | 10/2019 | Hasumi | B62M 6/50 |
| 2020/0180728 | A1 | 6/2020 | Ohashi | |
| 2020/0207216 | A1* | 7/2020 | Hasumi | B62M 9/04 |
| 2021/0197924 | A1* | 7/2021 | Higashi | B62M 6/50 |

FOREIGN PATENT DOCUMENTS

| | | | | |
|---|---|---|---|---|
| JP | 2001-270486 A | | 10/2001 | |
| JP | 2004-243920 A | | 9/2004 | |
| JP | 2014-042434 A | | 3/2014 | |
| JP | 2014042434 A | * | 3/2014 | ............ B60L 15/20 |
| JP | 2017-226296 A | | 12/2017 | |
| WO | 2019/035191 A1 | | 2/2019 | |
| WO | 2019/053889 A1 | | 3/2019 | |

\* cited by examiner

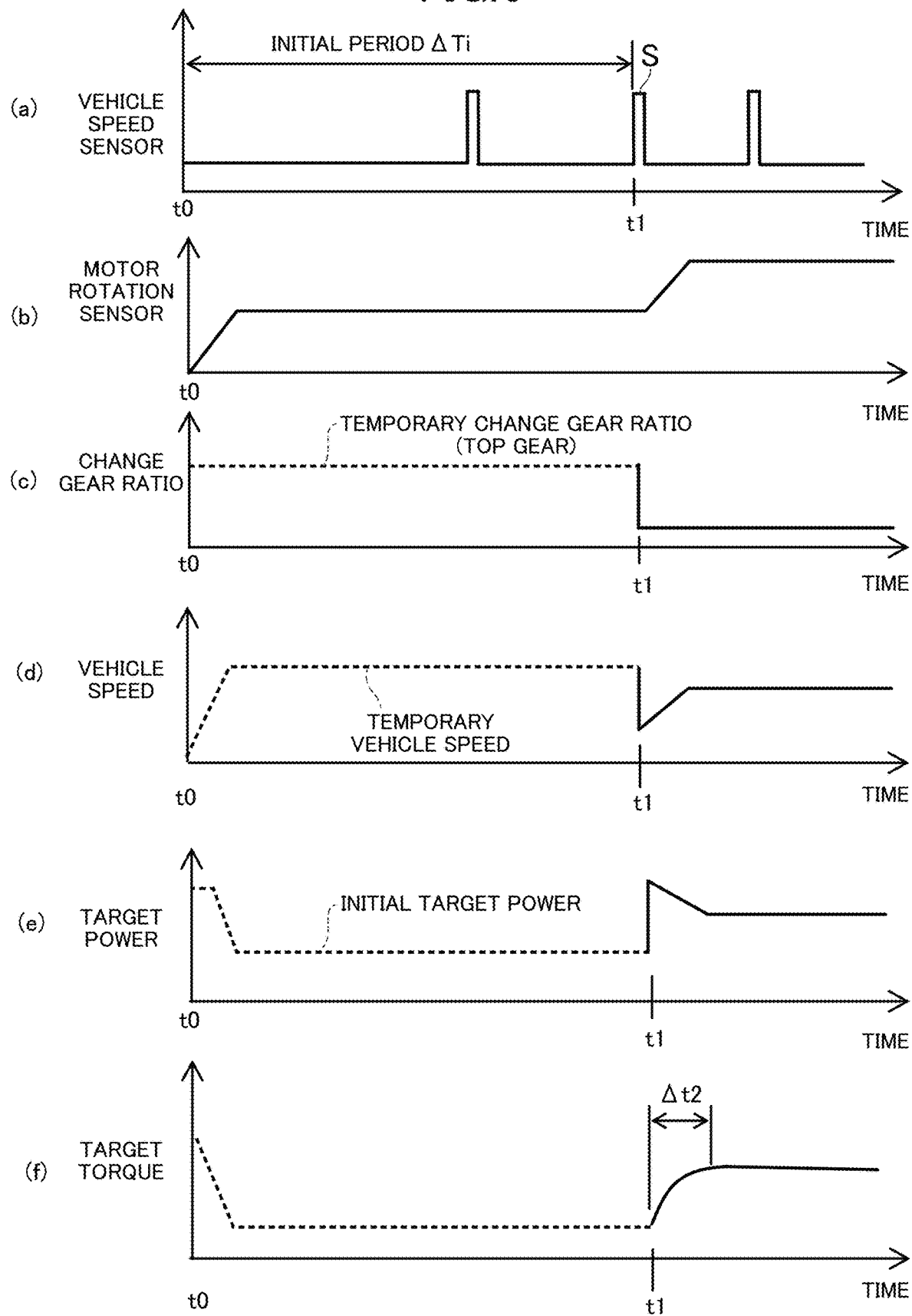

ELECTRIC ASSISTED BICYCLE, DRIVE SYSTEM THEREOF, AND CONTROL METHOD

CROSS REFERENCE TO RELATED APPLICATIONS

This application claims the benefit of priority to Japanese Patent Application No. 2019-239467 filed on Dec. 27, 2019. The entire contents of this application are hereby incorporated herein by reference.

BACKGROUND OF THE INVENTION

1. Field of the Invention

The present invention relates to an electric assisted bicycle, a drive system thereof, and a control method.

2. Description of the Related Art

Users sometimes walk a bicycle. That is, users sometimes walk on the side of a bicycle while pushing the bicycle forward by their hands. Some electric assisted bicycles have walk modes. When a user turns on a walk switch, an electric motor drives and walking of the bicycle by the user is assisted by torque of the electric motor. A vehicle described in JP 2014-42434 A has a map that associates a vehicle speed with power of the electric motor.

A controller of the electric motor sets power according to the vehicle speed sensed by a sensor as target power of the electric motor with reference to the map. The power of the electric motor is set as a target value, and thereby, a rear wheel may be driven with torque necessary to maintain the walking speed of the user regardless of a change gear ratio of a change gear mechanism.

A vehicle speed sensor includes, e.g., a magnet attached to a wheel and a Hall element attached to a frame. When the magnet comes to the position of the Hall element by rotation of the wheel, the Hall element outputs a pulse caused by a change in magnetic field. When the number of magnets attached to the wheel is smaller, for example, when only one magnet is attached to the wheel, the frequency at which the Hall element outputs the pulse is lower. Accordingly, it is not until a certain time elapses from the start of walking that the vehicle speed can be calculated and torque suitable for walking can be obtained from the electric motor. When the number of magnets attached to the wheel is increased, the vehicle speed can be calculated immediately after the start of walking, however, that leads to a cost increase of the bicycle.

SUMMARY OF THE INVENTION

An example of an electric assisted bicycle proposed in the present disclosure includes a front wheel, a rear wheel, an electric motor, a pedal, a power transmission path to transmit rotation of the electric motor and rotation of the pedal to the real wheel, a change gear mechanism in the power transmission path, a rotation sensor to output a signal according to a rotation speed of a mechanism upstream of the change gear mechanism in the power transmission path, a vehicle speed sensor to output a signal according to a rotation speed of the front wheel or the rear wheel, an operator to receive a walk command, and a controller to drive the electric motor when receiving the walk command. The controller includes a vehicle speed calculator to calculate a change gear ratio of the change gear mechanism based on the output signal of the vehicle speed sensor and output of the rotation sensor in response to acquisition of the output signal of the vehicle speed sensor, and calculate a vehicle speed based on the calculated change gear ratio and the output signal of the rotation sensor at a higher frequency than a frequency of the acquisition of the output signal of the vehicle speed sensor, an initial target calculator to calculate a target value to drive the electric motor without using the output signal of the vehicle speed sensor in a prescribed period from start of walking, when the walk command is received, and a target calculator to calculate the target value to drive the electric motor based on the vehicle speed calculated by the vehicle speed calculator after a lapse of the prescribed period. According to the configuration, the structure of the vehicle speed sensor may be simplified and a dedicated sensor to sense the change gear ratio is not necessary, and thus cost increase of the bicycle may be avoided. Further, the target value to drive the electric motor is calculated also in the prescribed period from the start of walking, and thus walking may be smoothly started.

An example of a drive system of an electric assisted bicycle proposed in the present disclosure includes an electric motor, a vehicle speed sensor to output a signal according to a rotation speed of a front wheel or a rear wheel, a rotation sensor to output a signal according to a rotation speed of a mechanism upstream of a change gear mechanism in a power transmission path, the power transmission path being for transmission of rotation of the electric motor and rotation of a pedal to the rear wheel, and a controller to drive the electric motor when receiving a walk command.

The controller includes a vehicle speed calculator to calculate a change gear ratio of the change gear mechanism in response to acquisition of the output signal of the vehicle speed sensor, based on the output signal of the vehicle speed sensor and the output signal of the rotation sensor, and calculate a vehicle speed based on the calculated change gear ratio and the output signal of the rotation sensor at a higher frequency than a frequency of the acquisition of the output of the vehicle speed sensor, an initial target calculator to calculate a target value to drive the electric motor without using the output signal of the vehicle speed sensor in a prescribed period from start of walking, when the walk command is received, and a target calculator to calculate the target value to drive the electric motor based on the vehicle speed calculated by the vehicle speed calculator after a lapse of the prescribed period. According to the configuration, the structure of the vehicle speed sensor may be simplified and a dedicated sensor to sense the change gear ratio is not necessary, and thus a cost increase of the bicycle may be avoided. Further, the target value to drive the electric motor is calculated also in the prescribed period from the start of walking, and thus walking may be smoothly started.

The initial target calculator may calculate the target value to drive the electric motor based on a temporary vehicle speed different from the vehicle speed calculated by the vehicle speed calculator.

A drive system of an electric assisted bicycle may further include a memory including basic information that defines the target value of the electric motor according to the vehicle speed in advance. The target calculator may calculate the target value to drive the electric motor based on the vehicle speed calculated by the vehicle speed calculator with reference to the basic information, and the initial target calculator may calculate the target value to drive the electric motor in a narrower range than a range of the target value defined in the basic information. According to the configuration, assistance in an appropriate range may be obtained from the electric motor in the prescribed period from the start of walking.

The initial target calculator may calculate the target value to drive the electric motor in a range including a lower limit value higher than a lower limit value of the target value defined in the basic information. According to the configuration, when a calculation that makes the target value to drive the electric motor lower is used in the prescribed period from the start of walking, the assist by the electric motor may be prevented from being excessively small.

A drive system of an electric assisted bicycle may further include a load sensor to sense a load on the bicycle. The initial target calculator may change the range of the target value according to the load sensed by the load sensor. According to the configuration, an assist according to the load may be obtained from the electric motor.

The initial target calculator may calculate the temporary vehicle speed based on a predetermined temporary change gear ratio and the output signal of the rotation sensor.

The predetermined temporary change gear ratio may be the maximum of change gear ratios that can be set by the change gear mechanism (change gear ratio=wheel rotation speed/electric motor rotation speed). According to the configuration, the target value is calculated on an assumption that the vehicle speed is higher and, as a result, the target value of the electric motor may be set to be lower.

When the target value to drive the electric motor calculated based on the temporary vehicle speed is lower than a prescribed lower limit value, the initial target calculator may set the prescribed lower limit value as the target value. According to the configuration, the assist by the electric motor may be prevented from being excessively small in the prescribed period from the start of walking.

The initial target calculator may calculate a predetermined value as the target value to drive the electric motor in the prescribed period. According to the configuration, a calculation of the target value may be simplified.

A drive system of an electric assisted bicycle may include a load sensor to sense a load on the bicycle. The initial target calculator may change the predetermined value according to the load sensed by the load sensor in the prescribed period. The assist according to the load may be obtained from the electric motor.

The vehicle speed sensor may include a sensed portion that rotates according to rotation of the rear wheel or the front wheel and a sensor main body that outputs a signal in response to coming of the sensed portion. The prescribed period may be a period from the start of walking to output of a second signal by the sensor main body.

The target value to drive the electric motor may be target power of the electric motor. According to the configuration, after the lapse of the prescribed period, the rear wheel is driven with torque necessary to keep the walking speed of the user regardless of the change gear ratio of the change gear mechanism.

An example of a control method for an electric assisted bicycle proposed in the present disclosure includes calculating a change gear ratio of a change gear mechanism in response to acquisition of an output signal from a vehicle speed sensor, based on an output signal of a rotation sensor to sense a rotation speed of a mechanism upstream of the change gear mechanism and based on the output signal of the vehicle speed sensor according to a rotation speed of a front wheel or a rear wheel, calculating a vehicle speed based on the calculated change gear ratio and the output of the rotation sensor at a higher frequency than a frequency of the acquisition of the output signal of the vehicle speed sensor, calculating a target value to drive an electric motor without using the output of the vehicle speed sensor in a prescribed period from start of walking, and calculating the target value to drive the electric motor based on the calculated vehicle speed after a lapse of the prescribed period. According to the configuration, the structure of the vehicle speed sensor may be simplified and a dedicated sensor to sense the change gear ratio is not necessary, and thus a cost increase of the bicycle may be avoided. Further, the target value to drive the electric motor is calculated also in the prescribed period from the start of walking, and thus walking may be smoothly started.

An example of an electric assisted bicycle proposed in the present disclosure includes a front wheel, a rear wheel, an electric motor, a pedal, a power transmission path to transmit rotation of the electric motor and rotation of the pedal to the real wheel, a change gear mechanism in the power transmission path, a rotation sensor to output a signal according to a rotation speed of a mechanism upstream of the change gear mechanism in the power transmission path, a vehicle speed sensor to output a signal according to a rotation speed of the front wheel or the rear wheel, an operator to receive a walk command, and a controller to drive the electric motor when receiving the walk command. The controller may include a vehicle speed calculator to calculate a change gear ratio of the change gear mechanism in response to acquisition of the output of the vehicle speed sensor based on the output signal of the vehicle speed sensor and the output signal of the rotation sensor, and calculate a vehicle speed based on the calculated change gear ratio and the output signal of the rotation sensor at a higher frequency than a frequency of the acquisition of the output of the vehicle speed sensor, an initial target calculator to calculate a target value to drive the electric motor in a prescribed period from start of walking based on a temporary vehicle speed different from the vehicle speed calculated by the vehicle speed calculator, when the walk command is received, and a target calculator to calculate the target value to drive the electric motor based on the vehicle speed calculated by the vehicle speed calculator after a lapse of the prescribed period. According to the configuration, the structure of the vehicle speed sensor may be simplified and a dedicated sensor to sense the change gear ratio is not necessary, and thus a cost increase of the bicycle may be avoided. Further, the target value to drive the electric motor is calculated also in the prescribed period from the start of walking, and thus walking may be smoothly started.

An example of a drive system of an electric assisted bicycle proposed in the present disclosure includes an electric motor, a vehicle speed sensor to output a signal according to a rotation speed of a front wheel or a rear wheel, a rotation sensor to output a signal according to a rotation speed of a mechanism upstream of a change gear mechanism in a power transmission path, the power transmission path being for transmission of rotation of the electric motor and rotation of a pedal to the rear wheel, and a controller to drive the electric motor when receiving a walk command. The controller includes a vehicle speed calculator to calculate a change gear ratio of the change gear mechanism in response to acquisition of the output signal of the vehicle speed sensor, based on the output signal of the vehicle speed sensor and the output signal of the rotation sensor, and calculate a vehicle speed based on the calculated change gear ratio and the output signal of the rotation sensor at a higher frequency than a frequency of the acquisition of the output signal of the vehicle speed sensor, an initial target calculator to calculate a target value to drive the electric motor based on a temporary vehicle speed different from the vehicle speed calculated by the vehicle speed calculator in a prescribed period from start of walking, when the walk command is received, and a target calculator to calculate the target value to drive the electric motor based on the vehicle speed calculated by the vehicle speed calculator after a lapse of the prescribed period. According to the configuration, the structure of the vehicle speed sensor may be simplified and a dedicated sensor to sense the change gear ratio is not necessary, and thus cost increase of the bicycle may be avoided. Further, the target value to drive the electric motor is calculated also in the prescribed period from the start of walking, and thus walking may be smoothly started.

An example of a control method for an electric assisted bicycle proposed in the present disclosure includes calculating a change gear ratio of a change gear mechanism in response to acquisition of an output signal from a vehicle speed sensor, based on an output signal of a rotation sensor to sense a rotation speed of a mechanism upstream of the change gear mechanism and based on the output signal of the vehicle speed sensor according to a rotation speed of a front wheel or a rear wheel, calculating a vehicle speed based on the calculated change gear ratio and the output of the rotation sensor at a higher frequency than a frequency of the acquisition of the output signal of the vehicle speed sensor, calculating a target value to drive of an electric motor based on a temporary vehicle speed different from the vehicle speed calculated based on the calculated change gear ratio and the output signal of the rotation sensor in a prescribed period from start of walking, and calculating the target value to drive the electric motor based on the vehicle speed calculated based on the calculated change gear ratio and the output signal of the rotation sensor after a lapse of the prescribed period. According to the configuration, the structure of the vehicle speed sensor may be simplified and a dedicated sensor to sense the change gear ratio is not necessary, and thus a cost increase of the bicycle may be avoided. Further, the target value to drive the electric motor is calculated also in the prescribed period from the start of walking, and thus walking may be smoothly started.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 6 is a time chart for explanation of processing executed by the controller in the initial period.

DETAILED DESCRIPTION OF THE PREFERRED EMBODIMENTS

The terminology used herein is for the purpose of describing particular preferred embodiments only and is not intended to be limiting of the present invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises", "comprising", "includes", and/or "including", when used in this specification, specify the presence of stated features, steps, operations, elements, and/or components, but do not preclude the presence or addition of one or more other features, steps, operations, elements, components, and/or groups thereof. As below, preferred embodiments of the present invention (hereinafter, referred to as "the preferred embodiments") will be explained with reference to the drawings.

Unless otherwise defined, all terms (including technical and scientific terms) used herein have the same meaning as commonly understood by one having ordinary skill in the art to which the present invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing preferred embodiments of the present invention, it will be understood that a number of technologies are disclosed. Each of these has individual benefits and each can also be used in conjunction with one or more, or in some cases all, of the other disclosed technologies. Accordingly, for the sake of clarity, this description will refrain from repeating every possible combination of the individual technologies in an unnecessary fashion. Nevertheless, the specification and claims should be read with the understanding that such combinations are entirely within the scope of the present invention and the claims.

In the following description, for purposes of explanation, numerous specific details are set forth in order to provide a thorough understanding of preferred embodiments of the present invention. It will be evident, however, to one skilled in the art that preferred embodiments of the present invention may be practiced without these specific details.

The present disclosure is to be considered as an exemplification of the present invention, and is not intended to limit the present invention to the specific preferred embodiments illustrated by the figures or description below.

Figure 1:
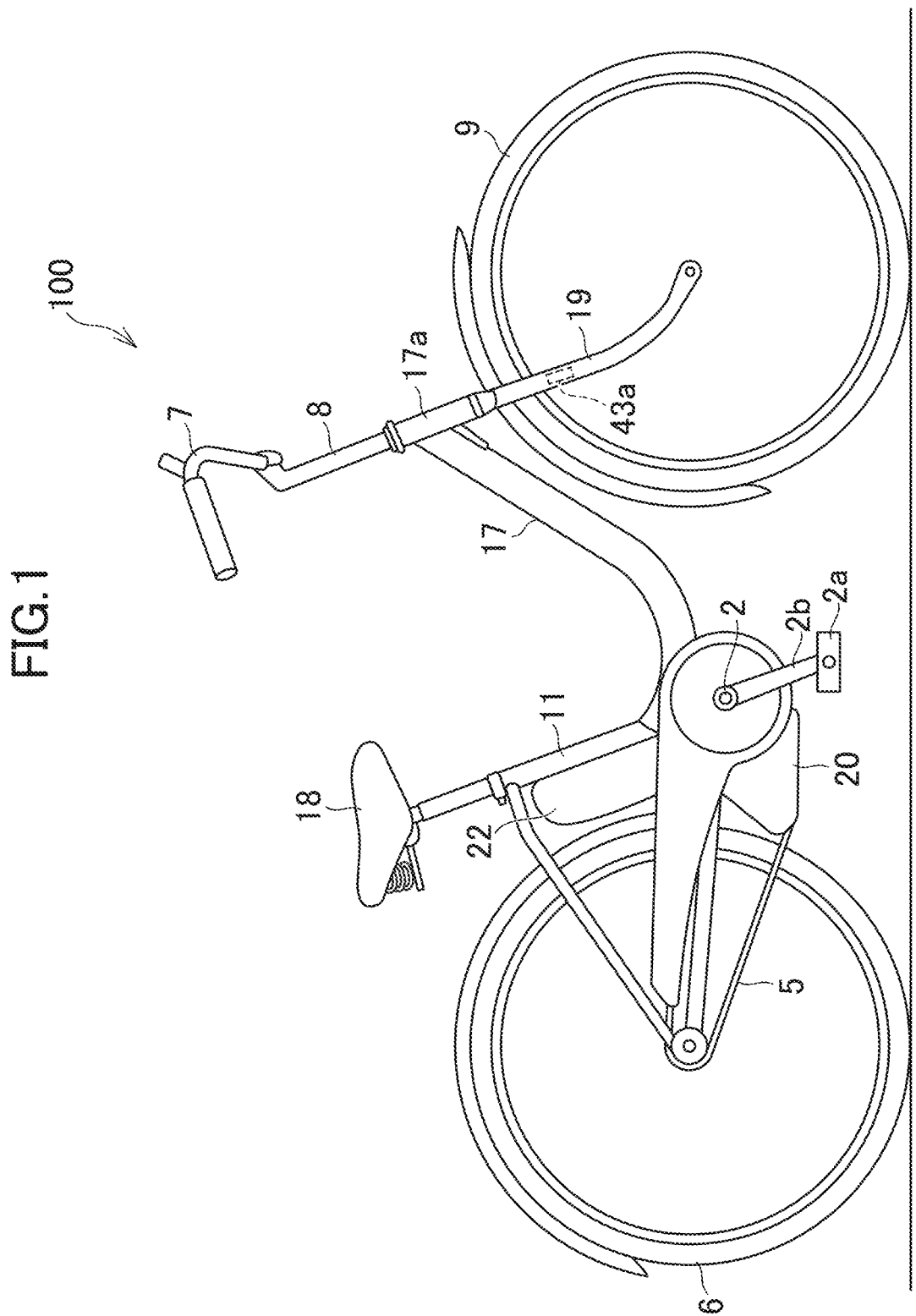
FIG. 1 is a side view showing an example of an electric assisted bicycle proposed in the present disclosure.
Figure 2:
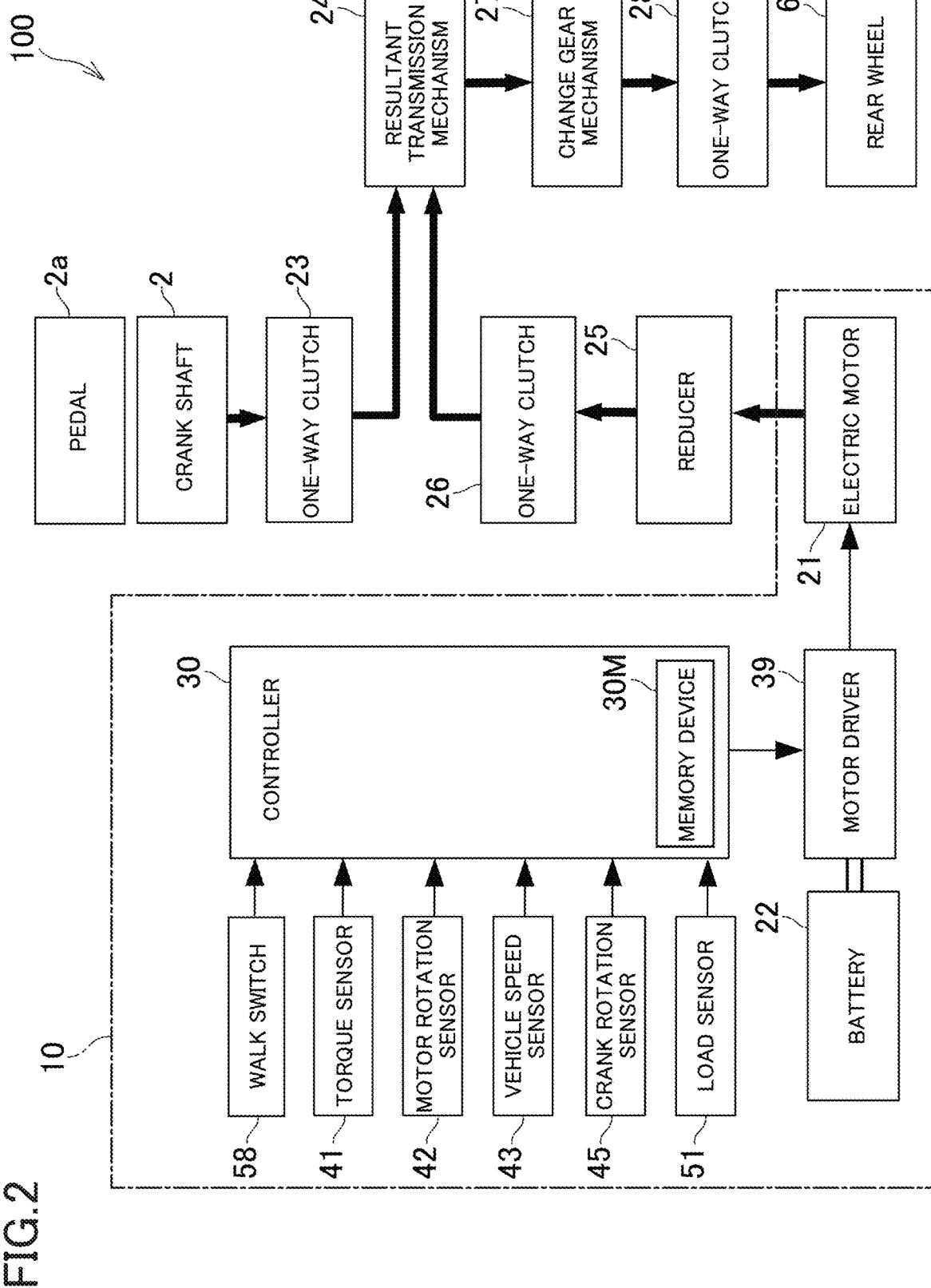
FIG. 2 is a block diagram showing component elements of the electric assisted bicycle.

The present invention will now be described by referencing the appended figures representing preferred embodiments. FIG. 1 is a side view of an electric assisted bicycle 100 as an example of a preferred embodiment of the present invention. FIG. 2 is a block diagram showing hardware of the electric assisted bicycle 100. In FIG. 2, thick solid lines show power transmission and thin solid lines show signals and currents. The electric assisted bicycle 100 includes a drive system 10 to assist a pedal effort of an operator. The drive system 10 includes electric components such as an electric motor 21, a controller 30, a motor driver 39, and a walk switch 58, which will be described later. Hereinafter, the electric assisted bicycle 100 is simply referred to as "bicycle".

As shown in FIG. 1, the bicycle 100 includes a crank shaft 2. The crank shaft 2 includes a crank arm extending in a radial direction and a pedal 2a is coupled to an end portion of the crank arm. The crank shaft 2 is supported by a lower end of a seat tube 11. A saddle 18 is fixed to an upper end of the seat tube 11. In a front portion of the bicycle 100, a handle stem 8, a handle 7 fixed to an upper portion of the handle stem 8, a front fork 19 fixed to a lower portion of the handle stem 8, and a front wheel 9 supported by a lower end of the front fork 19 are provided. The handle stem 8 is supported by a head pipe 17a provided on a front end of the frame 17. The shape of the frame 17 is not limited to the example shown in FIG. 1, but may be appropriately changed.

As shown in FIG. 1, the bicycle 100 includes a drive unit 20. The drive unit 20 includes the electric motor 21 (see FIG. 2) that outputs a force (auxiliary torque) assisting driving of a rear wheel 6 and a reducer 25 (see FIG. 2). The electric motor 21 drives by electric power supplied from a battery 22. In an example, the battery 22 is attached to a rear side of the seat tube 11, and the drive unit 20 is placed on the rear side of the crank shaft 2. The positions of the electric motor 21 and the battery 22 are not limited to the example of the bicycle 100, but may be appropriately changed.

A force applied to the crank shaft 2 through the pedal 2a is transmitted to a resultant transmission mechanism 24 through a one-way clutch 23 as shown in FIG. 2. In an example, the power (auxiliary torque) output from the electric motor 21 is transmitted to the resultant transmission mechanism 24 through the reducer 25 and a one-way clutch 26. The resultant transmission mechanism 24 includes a shaft, a rotating member provided on the shaft, and a chain 5 (FIG. 1) and synthesizes the force applied to the crank shaft 2 and the power output from the electric motor 21. In an example of the resultant transmission mechanism 24, two forces are input to a common shaft or common rotating member and synthesized. As another example, both the force applied to the crank shaft 2 and the power output from the electric motor 21 may be input to the chain 5 and synthesized. As shown in FIG. 2, the power synthesized in the resultant transmission mechanism 24 is transmitted to the rear wheel 6 through, e.g., a change gear mechanism 27 and a one-way clutch 28.

The change gear mechanism 27 is placed in a power transmission path extending from the electric motor 21 and the crank shaft 2 to the rear wheel 6. The change gear mechanism 27 includes a plurality of changeable gear levels (first, second, etc.) In an example, the plurality of gear levels can be changed by operation of an operator (e.g., a lever) provided on the handle 7. The change gear mechanism 27 includes, e.g., a plurality of gears. The change gear mechanism 27 may be a type housed inside of a hub of the rear wheel 6 or a type placed outside of the hub. The controller 30 calculates a change gear ratio using an output signal of a vehicle speed sensor 43 and an output signal of a motor rotation sensor 42, which will be described later. No dedicated sensor to sense the gear level is provided in the change gear mechanism 27. In the following explanation, the change gear ratio of the change gear mechanism 27 refers to a change gear ratio at each gear level (change gear ratio=rotation speed of wheel/rotation speed of electric motor 21).

The bicycle 100 includes a sensor to sense a pedal effort applied to the pedal 2a by the operator. The sensor is, e.g., a torque sensor 41 (see FIG. 2) to output a signal according to torque generated in the crank shaft 2. The torque sensor 41 is, e.g., a magnetostrictive sensor provided in the crank shaft 2, but may be another type of sensor.

The bicycle 100 includes the vehicle speed sensor 43 that outputs a signal according to the rotation speed of the front wheel 9, the motor rotation sensor 42 that outputs a signal according to the rotation speed of the electric motor 21, and a crank rotation sensor 45 that outputs a signal according to the rotation speed of the crank shaft 2.

The vehicle speed sensor 43 is, e.g., a magnetic rotation sensor and includes a magnet (sensed portion) attached to the front wheel 9 and a sensor main body 43a (see FIG. 1) including a Hall element attached to a vehicle body (e.g. a frame). The sensor main body 43a outputs a pulse signal in response to coming of the magnet to the position of the sensor main body 43a. The vehicle speed sensor 43 may be a sensor that outputs a signal according to the rotation speed of the rear wheel 6. In this case, the vehicle speed sensor 43 may be provided in the rear wheel 6 or provided in a position different from that of the rear wheel 6 at the downstream of the change gear mechanism 27 in the power transmission path.

Also, the motor rotation sensor 42 is, e.g., a magnetic sensor including a Hall element. The Hall element outputs a pulse signal at a time when the magnet of the electric motor 21 comes to the position of the motor rotation sensor 42. The controller 30 calculates the rotation speed of the electric motor 21 based on the output signal (pulse signal) of the motor rotation sensor 42 and calculates the vehicle speed based on the output signal (pulse signal) of the vehicle speed sensor 43. The motor rotation sensor may be provided in a position different from that of the electric motor 21 at the upstream of the change gear mechanism 27 (closer to the electric motor 21 than the change gear mechanism 27) in the power transmission path from the electric motor 21 to the rear wheel 6. For example, the motor rotation sensor 42 may be provided in a gear or a rotation shaft forming the reducer 25. In this case, the controller 30 may calculate the rotation speed of the electric motor 21 based on the reduction ratio of the reducer 25 and the output signal of the motor rotation sensor 42.

The crank rotation sensor 45 is, e.g., a sensor that generates a pulse signal by the rotation of the crank shaft 2. Also, the crank rotation sensor 45 is a magnetic rotation sensor and includes a magnet attached to the crank shaft 2 and a sensor main body including a Hall element. The controller 30 calculates an amount of rotation (angle change) of the crank shaft 2, the rotation speed of the crank shaft 2, etc., based on the output signal of the crank rotation sensor 45.

The bicycle 100 includes the walk switch 58 for operation by a user. The walk switch 58 includes a button or a lever that can be operated by the user and inputs a signal according to the operation as a walk command to the controller 30. When the walk command is input to the controller 30, the controller 30 drives the electric motor 21 and assists walking by the user regardless of the force applied to the pedal 2a. "Walking" refers to, e.g., walking on the side of the bicycle 100 while the user pushing the handle or walking while the user straddling the saddle 18.

Further, the bicycle 100 may include a load sensor 51 to sense a load acting on the bicycle 100. The load is, e.g., a resistance against the motion of the bicycle 100 caused by an inclination of a road surface, air resistance, or friction. The bicycle 100 may include an acceleration sensor to output a signal according to the inclination of the road surface as the load sensor 51.

The bicycle 100 includes the controller 30 that controls the electric motor 21 based on the output signal of the torque sensor 41. As shown in FIG. 2, the controller 30 includes a memory device 30M that holds programs and maps relating to the control of the electric motor 21 and a processor that executes the programs. The processor includes a CPU (Central Processing Unit) and the memory device 30M includes a RAM (Random Access Memory) and a ROM (Read Only Memory).

In the memory of the controller 30, a map representing a relationship between an assist ratio and the vehicle speed is stored.

When a rider pushes the pedal 2a, the controller 30 calculates an assist force according to the assist ratio for the vehicle speed and the pedal effort sensed based on the output signal of the torque sensor 41, and outputs a command value according to the assist force to the motor driver 39. The motor driver 39 receives the electric power of the battery 22 and supplies electric power according the command value to the electric motor 21.

When the walk command is input to the controller 30 through the switch 58, the controller 30 drives the electric motor 21 and assists walking by the user regardless of the force applied to the pedal 2a. As will be described later, in a prescribed period from the start of walking, the calculation of the vehicle speed using the vehicle speed sensor 43 is not available. Accordingly, in an example, in the prescribed period, the controller 30 calculates a target value to drive the electric motor 21 without using the output signal of the vehicle speed sensor 43. After a lapse of the prescribed period, the controller calculates the target value to drive the electric motor 21 based on the vehicle speed calculated using the output signal of the vehicle speed sensor 43. The target value to drive the electric motor 21 may be specifically a target value for power (rotation speed×torque) of the electric motor 21 or a target value for torque of the electric motor 21.

Figure 3:
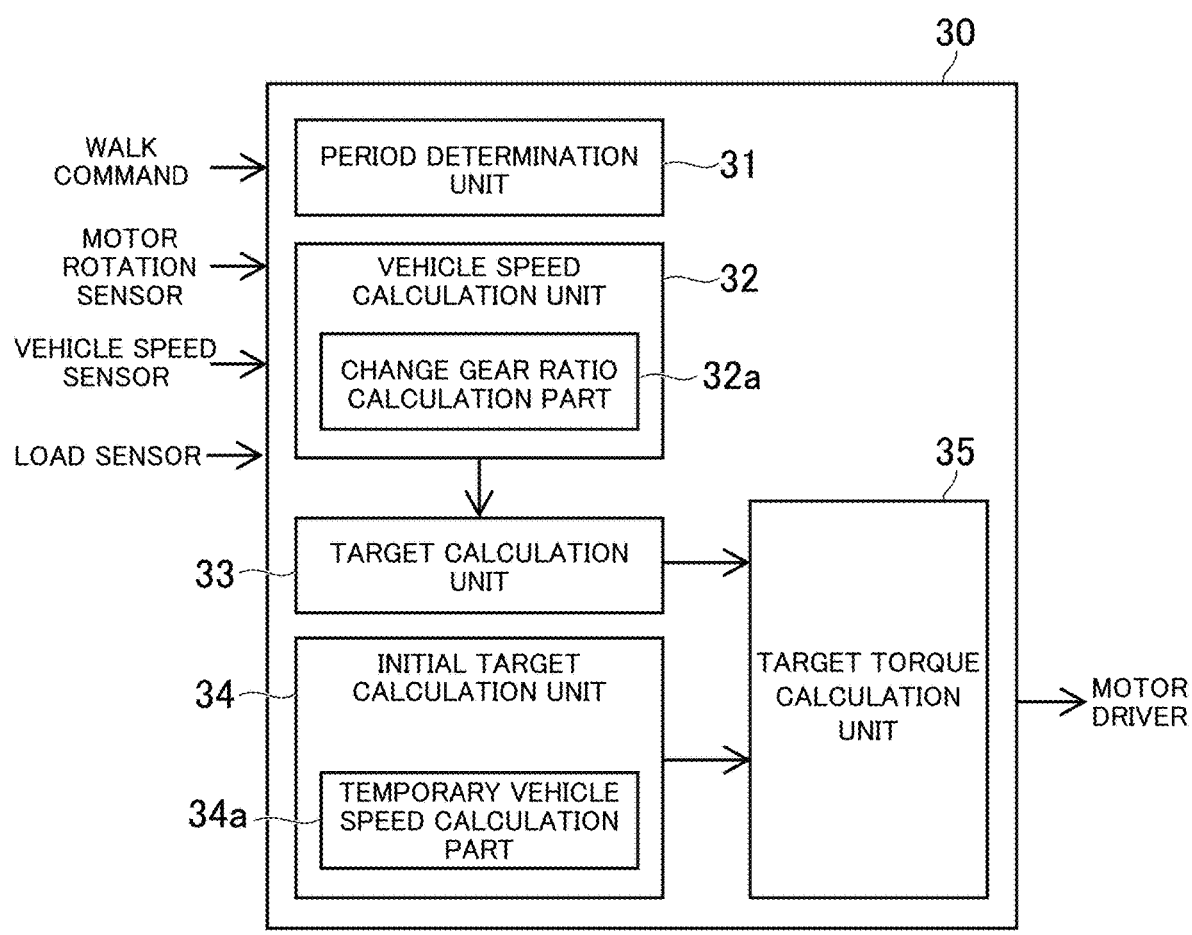
FIG. 3 is a block diagram showing functions of a controller of the electric assisted bicycle.

FIG. 3 is a block diagram showing functions of the controller 30. In the example explained below, target value for the power of the electric motor 21 is used as the target for the electric motor 21. The word "power" of the electric motor 21 is here used as the amount of energy generated by the electric motor 21 per unit time. Hereinafter, the target value is referred to as "target power". As shown in FIG. 3, the controller 30 is configured or programmed to include a period determination unit 31, a vehicle speed calculation unit 32, a target calculation unit 33, an initial target calculation unit 34, and a target torque calculation unit 35. These are realized by execution of the programs stored in the memory device 30M by the processor of the controller 30.

First, the target calculation unit 33 is explained. The target calculation unit 33 calculates target power based on the vehicle speed calculated by the vehicle speed calculation unit 32 using the output signal of the vehicle speed sensor 43. In the memory device 30M, basic information that associates the vehicle speed with the target power is stored in advance. The target calculation unit 33 calculates power according to the vehicle speed calculated by the vehicle speed calculation unit 32 as target power with reference to the basic information.

Figure 4:
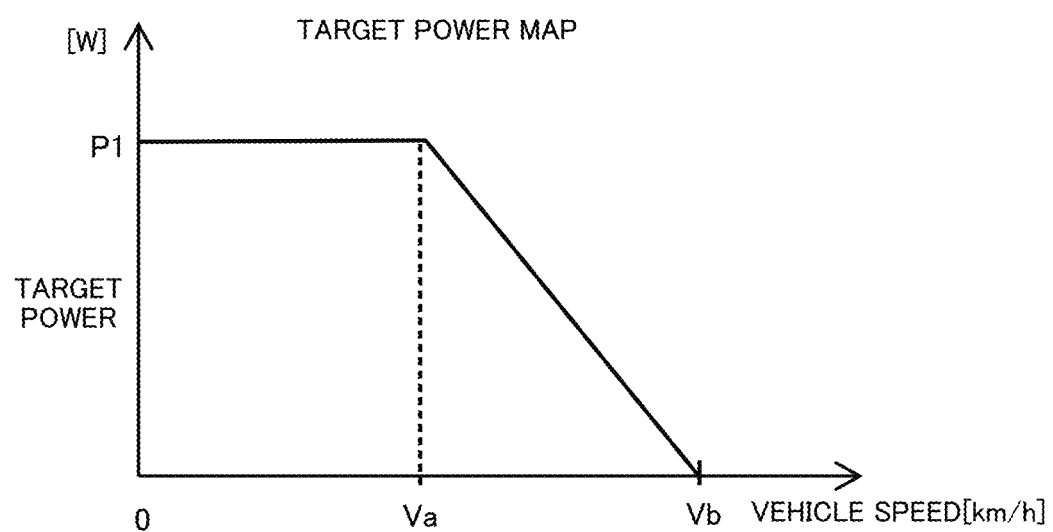
FIG. 4 shows an example of basic information (target power map).

The basic information is, e.g., a map. Hereinafter, the map is referred to as "target power map". FIG. 4 shows an example of the target power map. In the example of FIG. 4, the target power is constant at P1 in a speed range where the vehicle speed is from 0 to Va. In a speed range where the vehicle speed is higher than Va, the target power gradually decreases according to the vehicle speed and becomes 0 at a vehicle speed Vb. The vehicle speed Vb is equal or substantially equal to the walking speed of a human and may be, e.g., about 6 km/h. Hereinafter, the vehicle speed Vb is referred to as "assist upper limit vehicle speed". The target calculation unit 33 calculates power according to the vehicle speed calculated by the vehicle speed calculation unit 32 as target power with reference to the target power map. Note that the basic information associating the vehicle speed with the target power is not limited to the map, but may be, e.g., an arithmetic expression.

Note that the power is set as the target value of the electric motor 21, and thus, torque according to the current vehicle speed (walking speed) is transmitted to the rear wheel 6 independent of the current gear level of the change gear mechanism 27. The torque transmitted to the rear wheel 6 is obtained by the following expression.

$$Tr=P/\omega$$

Figure 5:
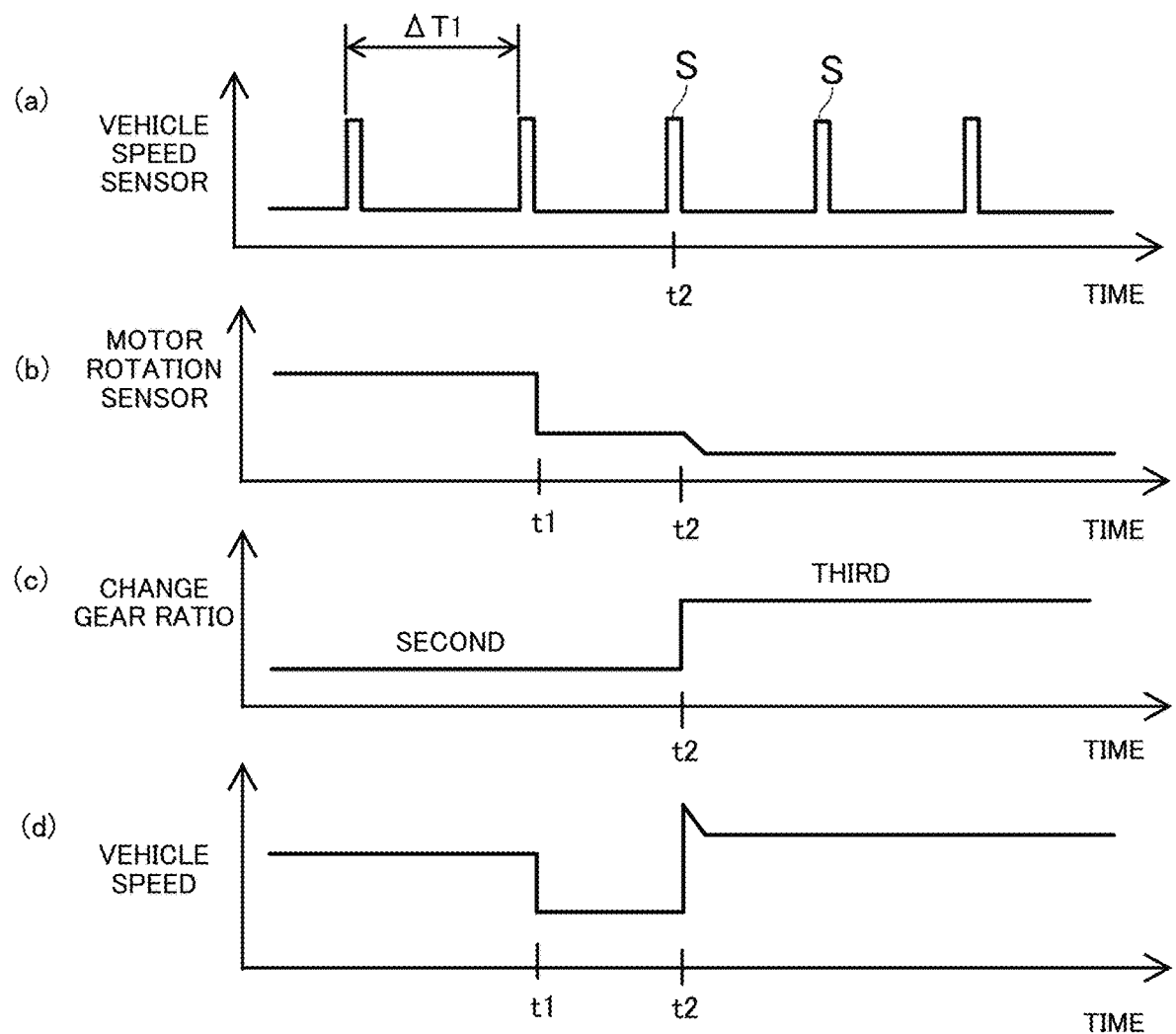
FIG. 5 is a time chart for explanation of processing executed by the controller after a lapse of an initial period.

Tr: torque of rear wheel
P: power of electric motor
ω: rotation speed of rear wheel FIG. 5 is a time chart for explanation of an example of processing executed by the vehicle speed calculation unit 32. In FIG. 5, (a) shows the output signal (pulse signals) of the vehicle speed sensor 43, (b) shows the output signal of the motor rotation sensor 42, (c) shows the calculated change gear ratio (the change gear ratio recorded in the memory device 30M), and (d) shows the vehicle speed calculated from the change gear ratio recorded in the memory device 30M and the output signal of the motor rotation sensor 42.

The vehicle speed calculation unit 32 calculates the vehicle speed using the output signal (pulse signals S shown in (a) of FIG. 5) of the vehicle speed sensor 43. The vehicle speed calculation unit 32 calculates the vehicle speed from, e.g., a difference ΔT1 between times when successive two pulse signals are acquired (see (a) of FIG. 5). As described above, the vehicle speed sensor 43 includes the magnet attached to the front wheel 9. The sensor main body 43a outputs the pulse signals in response to the coming of the magnet to the position of the sensor main body 43a. The number of magnets is not larger and the frequency at which the sensor main body 43a outputs the pulse signal is not higher. The number of magnets is, e.g., one. In this case, only one pulse signal is output per rotation of the front wheel 9 and, when the magnet is apart from the position of the sensor main body 43a, calculation of the vehicle speed at the time is not available. On the other hand, the motor rotation sensor 42 outputs signals according to the rotation speed of the electric motor 21 at a higher frequency than that of the vehicle speed sensor 43 (see (b) of FIG. 5). That is, the motor rotation sensor 42 outputs more pulse signals than the vehicle speed sensor 43 while the front wheel 9 provided with the vehicle speed sensor 43 rotates once. In (b) of FIG. 5, the frequency of the output signal (pulse signal) of the motor rotation sensor 42 is higher, and the output signal of the motor rotation sensor 42 is shown as a line along the time axis. An example of the motor rotation sensor 42 is the Hall element provided in the electric motor 21 and outputs the pulse signals at times when a plurality of permanent magnets of the electric motor 21 respectively come to the position of the Hall element. Accordingly, the vehicle speed calculation unit 32 calculates the vehicle speed not only using the output signal of the vehicle speed sensor 43 but also using the output signal (pulse signals) of the motor rotation sensor 42. In this manner, the controller 30 may estimate the current vehicle speed without time delay. As below, this will be explained in detail.

As shown in FIG. 3, the vehicle speed calculation unit 32 includes a change gear ratio calculation part 32*a*. No dedicated sensor to sense the change gear ratio is provided in the change gear mechanism 27. Accordingly, the cost of the bicycle 100 may be reduced. The change gear ratio calculation part 32*a* calculates the change gear ratio of the change gear mechanism 27 based on the output signal of the vehicle speed sensor 43 and an output signal of a rotation sensor that outputs a signal according to a rotation speed of a mechanism at the upstream of the change gear mechanism (closer to the electric motor 21 or the pedal 2*a*) in the power transmission path. In an example, the motor rotation sensor 42 may be used as the rotation sensor. The crank rotation sensor 45 may be used as the rotation sensor. The change gear ratio calculation part 32*a* calculates the change gear ratio of the change gear mechanism 27 as shown in (c) of FIG. 5 based on the vehicle speed and the motor rotation speed in response to the acquisition of the output signal of the vehicle speed sensor 43, i.e., at the times of acquisition of the pulse signals from the vehicle speed sensor 43.

Note that, in FIG. 5, the actual change gear of the change gear mechanism 27 (change gear from the second gear to the third gear) caused by the operation of a rider is performed at time t1. However, the change gear ratio recorded in the memory device 30M is updated when the output signal of the vehicle speed sensor 43 is acquired, and thus, the change gear ratio shown in (c) of FIG. 5 does not change at time t1. Accordingly, the vehicle speed shown in (d) of FIG. 5 becomes lower according to reduction of the motor rotation speed sensed based on the output signal of the motor rotation sensor 42. (The vehicle speed shown in (d) of FIG. 5 is the vehicle speed calculated based on the change gear ratio recorded in the memory device 30M and the motor rotation speed.) After the actual change gear of the change gear mechanism 27 is performed, a correct change gear ratio (change gear ratio of third) is calculated based on the vehicle speed calculated based on the output signal of the vehicle speed sensor 43 and the motor rotation speed sensed based on the output signal of the motor rotation sensor 42 at time (t2) when the output signal (pulse signal S) of the vehicle speed sensor 43 is obtained (see (c) of FIG. 5).

Specifically, the change gear ratio calculation part 32*a* calculates the vehicle speed (the rotation speed of the front wheel 9 in the bicycle 100) at the time when the pulse signal is acquired from the vehicle speed sensor 43, and calculates the motor rotation speed based on the output signal of the motor rotation sensor 42 (see (b) of FIG. 5) (that is, based on the difference between the times when the successive two pulse signals are acquired). The change gear ratio calculation part 32*a* calculates the change gear ratio by division of the vehicle speed (the rotation speed of the front wheel 9) by the motor rotation speed, and updates the change gear ratio recorded in the memory device 30M to the latest change gear ratio at each time when calculating the change gear ratio.

The vehicle speed calculation unit 32 calculates the vehicle speed based on the change gear ratio calculated in the gear ratio calculation part 32*a* (the latest change gear ratio recorded in the memory device 30M) and the output signal of the motor rotation sensor 42. For example, the vehicle speed calculation unit 32 calculates the vehicle speed by multiplying the motor rotation speed calculated from the output signal of the motor rotation sensor 42 by the calculated change gear ratio. The motor rotation sensor 42 outputs the signal according to the rotation speed of the electric motor 21 (see (b) of FIG. 5) at the higher frequency than that of the vehicle speed sensor 43. Accordingly, the vehicle speed calculation unit 32 calculates the vehicle speed at the higher frequency than the frequency of the obtainment of the output signal (pulse signal) of the vehicle speed sensor 43. As a result, as shown in FIG. 5 (*d*), the vehicle speed calculation unit 32 calculates the vehicle speed also at the different time from the time when the vehicle speed sensor 43 outputs the pulse signal. Thus, calculated vehicle speed is used in the target calculation unit 33.

Next, processing executed by the initial target calculation unit 34 is explained. FIG. 6 is a time chart for explanation of an example of processing executed by the initial target calculation unit 34. In FIG. 6, (a) shows the output signal (pulse signal) of the vehicle speed sensor 43, (b) shows the output signal of the motor rotation sensor 42, (c) shows the calculated change gear ratio (the change gear ratio recorded in the memory device 30M), (d) shows a temporary vehicle speed or the vehicle speed calculated from the change gear ratio and the output signal of the motor rotation sensor 42, (e) is the target power obtained from the vehicle speed of (d), and (f) is the target torque calculated from the target power of (e). The frequency of the output signal (pulse signal) of the motor rotation sensor 42 is higher, and the output signal of the motor rotation sensor 42 is shown as a line along the time axis in (b) of FIG. 6.

The controller 30 receives the walk command at time t0 shown in the same drawing. When the walk command is received, in a prescribed period from the start of walking (a period ΔTi in (a) of FIG. 6), the initial target calculation unit 34 calculates the target power of the electric motor 21 without using the output signal of the vehicle speed sensor 43. Here, "without using the output signal of the vehicle speed sensor 43" means that the change gear ratio and the vehicle speed are not calculated using the method performed by the vehicle speed calculation unit 32. Therefore, the controller 30 may use the output signal of the vehicle speed sensor 43 in the period ΔTi for another purpose, e.g., abnormality determination of the vehicle speed sensor 43. Hereinafter, the period ΔTi is referred to as "initial period". The target value for the power of the electric motor 21 calculated in the initial period ΔTi is referred to as "initial target power".

As described above, the difference ΔT1 between times when successive two pulse signals are acquired (see FIG. 5) is used for the calculation of the vehicle speed. Accordingly, the vehicle speed is not calculated before at least the second output signal (pulse signal S3, see FIG. 6 (*a*)) is input to the controller after the walking is started. When the number of magnets attached to the front wheel 9 is smaller, a period taken before the second output signal (pulse signal S3) is input to the controller 30 is longer. Accordingly, the initial target calculation unit 34 calculates the target value (i.e., the initial target power) for the power of the electric motor 21 based on the temporary vehicle speed different from the vehicle speed calculated by the vehicle speed calculation unit 32 in the initial period ΔTi.

The initial target calculation unit 34 calculates the target power and calculates the power corresponding to the temporary vehicle speed as the initial target power with reference to basic information that associates the vehicle speed with the target power. The basic information referred to by the initial target calculation unit 34 may be the same as the basic information referred to by the target calculation unit 33

(e.g. the target power map exemplified in FIG. 4). Thus, the processing performed by the controller 30 may be simplified.

As shown in (a) of FIG. 6, the initial period ΔTi is, e.g., a period after the walk command is provided and before the controller 30 acquires the second output signal (pulse signal S3) of the vehicle speed sensor 43. The initial period ΔTi may be longer than that. For example, the initial period ΔTi may be a period after the walk command is provided and before the controller 30 acquires the third output signal (pulse signal) of the vehicle speed sensor 43.

The initial target calculation unit 34 includes a temporary vehicle speed calculation part 34a. The temporary vehicle speed calculation part 34a calculates the temporary vehicle speed based on, e.g., a predetermined temporary change gear ratio and the output signal of the motor rotation sensor 42 (see (b) of FIG. 6). The temporary change gear ratio is a change gear ratio at a predetermined gear level, e.g., a change gear ratio of the top gear (the highest gear level). That is, the temporary change gear ratio is the maximum change gear ratio of the change gear ratios of the respective plurality of gear levels (change gear ratio=wheel rotation speed/motor rotation speed). The initial target calculation unit 34 calculates the initial target power based on the temporary vehicle speed calculated in the above described manner.

Figure 7A:
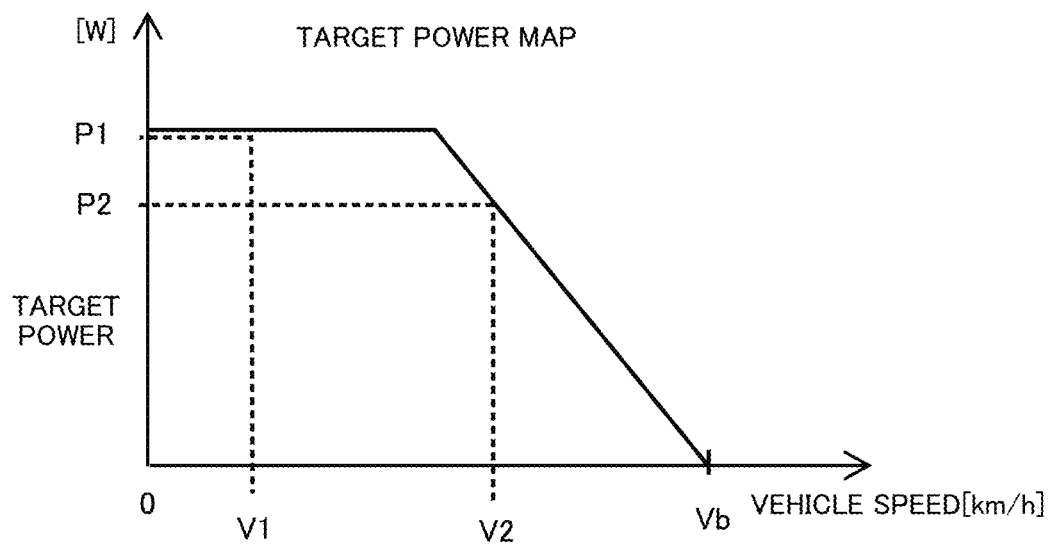
FIG. 7A is a diagram for explanation of processing executed by an initial target calculation unit.

The change gear ratio of the top gear is used as the temporary change gear ratio, the vehicle speed at walking may be suppressed to be lower. The reason will be explained with reference to a target power map exemplified in FIG. 7A. In this explanation, a case where, while the temporary change gear ratio is the change gear ratio of the top gear, the actual gear level of the change gear mechanism 27 is a low gear (the gear level of the lowest) is assumed. In FIG. 7A, when the actual vehicle speed is V1, the temporary change gear ratio is the change gear ratio of the top gear, a temporary vehicle speed V2 is higher than the actual vehicle speed V1. In a speed range higher than the vehicle speed Va, the target power defined by the target power map gradually decreases with increase of the vehicle speed. Accordingly, target power P2 corresponding to the temporary vehicle speed V2 is equal to or lower than the target power P1 corresponding to the actual vehicle speed V1. Thus, the vehicle speed at walking may be suppressed to be lower.

Note that the temporary change gear ratio is not necessarily the maximum change gear ratio.

For example, the temporary change gear ratio may be a change gear ratio at the lower gear level than the top gear. In an example, the temporary change gear ratio may be a change gear ratio at an intermediate gear level or a change gear ratio at the gear level of the low gear. In this case, the initial target calculation unit 34 may calculate the target power corresponding to the temporary vehicle speed with reference to basic information different from the above described basic information referred to by the target calculation unit 33 (e.g., the target power map exemplified in FIG. 4).

Further, the temporary change gear ratio is not necessarily the same as the change gear ratios of the plurality of gear levels. For example, the temporary change gear ratio may be a change gear ratio between the change gear ratio of the fifth (top gear) and the change gear ratio of the fourth. Thus, the temporary vehicle speed based on the change gear ratio appropriate for walking independent of the change gear ratio of the gear level may be calculated.

When the temporary vehicle speed or the temporary change gear ratio is used, the power obtained from the electric motor 21 is too low or too high depending on the actual change gear ratio or the actual vehicle speed, and thus, an assist by the electric motor 21 may be unsuitable for walking by the user. For example, when the change gear ratio of the top gear is used as the temporary change gear ratio and the actual change gear ratio is the change gear ratio of the low gear, as shown in FIG. 7B, the power P2 obtained from the electric motor 21 is too much lower than the power P1 that should be properly obtained (power corresponding to the actual vehicle speed V1), and accordingly, the assist may be insufficient.

Figure 7B:
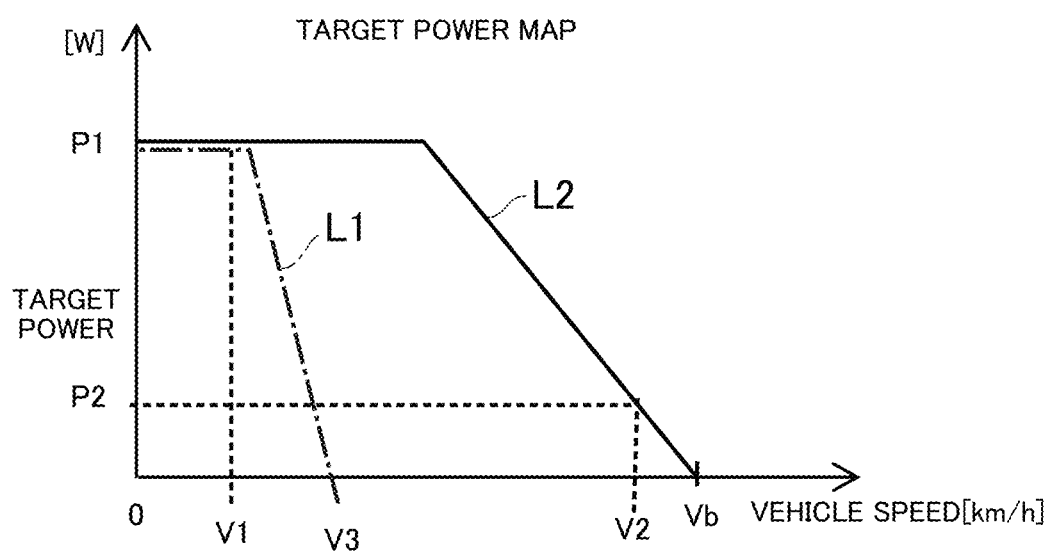
FIG. 7B is a diagram for explanation of processing executed by the initial target calculation unit.

Further, even when the basic information (target power map) is defined to continue the assist by the electric motor 21 until the vehicle speed reaches the assist upper limit vehicle speed Vb, in a case where the change gear ratio of the top gear is used as the temporary change gear ratio, driving (assist) of the electric motor 21 is stopped when the actual vehicle speed reaches a vehicle speed V3 lower than the assist upper limit vehicle speed Vb (see FIG. 7B). In FIG. 7B, a dashed-two dotted line L1 shows a relationship between the actual vehicle speed and the target power when the temporary vehicle speed and the target power change along a line L2 defined for the basic information.

Accordingly, the initial target calculation unit 34 may calculate the initial target power in a narrower range than the range of the target power defined by the basic information (target power map) used by the target calculation unit 33. In the target power map used by the target calculation unit 33, the maximum P1 of the target power (see FIG. 8) and the minimum (zero) of the target power are defined. The initial target calculation unit 34 may calculate the initial target power in a narrower range R2 (see FIG. 8) than a range R1 from the maximum P1 to the minimum (zero). Thus, the power obtained from the electric motor 21 may be prevented from being too low or too high.

In an example, the initial target calculation unit 34 may use an upper limit value lower than the maximum P1 of the target power defined in the target power map used by the target calculation unit 33 and/or may use a lower limit value higher than the minimum of the target power defined in the target power map used by the target calculation unit 33. In another example, by using different basic information (target power map) from the target power map used by the target calculation unit 33, the initial target calculation unit 34 may set the target power in a narrower range than that for the target calculation unit 33.

In the example in which the temporary change gear ratio is the change gear ratio of the top gear, the target power corresponding to the temporary vehicle speed is lower than the target power corresponding to the actual vehicle speed. To prevent the initial target power from being lower than necessary, the initial target calculation unit 34 may use a lower limit value Pe (see FIG. 8) in the calculation of the target power. When the target power corresponding to the temporary vehicle speed is higher than the lower limit value Pe, the initial target calculation unit 34 sets the target power corresponding to the temporary vehicle speed as the initial target power. On the other hand, when the target power corresponding to the temporary vehicle speed is lower than the lower limit value Pe, the initial target calculation unit 34 may use the lower limit value Pe as the initial target power. That is, the initial target calculation unit 34 may calculate the initial target power in the range R2 having the lower limit value Pe higher than the lower limit value (zero) of the target power defined in the target power map (see FIG. 8).

Figure 8:
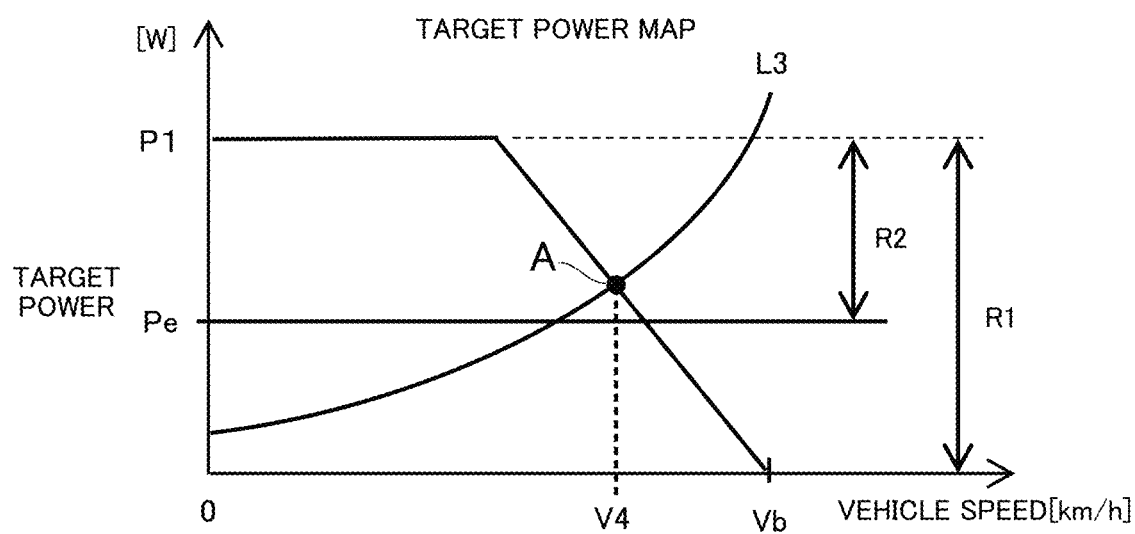
FIG. 8 is a diagram for explanation of processing executed by the initial target calculation unit.

Note that, in FIG. 8, a curve L3 is a load curve showing an example of a relationship between a load (resistance)

acting at walking and the vehicle speed. The load is a resistance against the motion of the bicycle 100 caused by an inclination of a road surface, air resistance, or friction. The load curve L3 shows, e.g., a load on the bicycle 100 on a windless flat road.

When the temporary change gear ratio is the change gear ratio of the top gear and the actual change gear ratio is also the change gear ratio of the top gear, in a speed range lower than a vehicle speed V4 at an intersection A between the load curve L3 and the line L2 defining the target power, the target power is higher than the load shown by the curve L3, and the vehicle speed gradually increases by the torque of the electric motor 21 without the user pushing the bicycle 100. The load and the torque of the electric motor 21 are balanced at the intersection A. Then, when the user walks while pushing the bicycle 100 forward, the vehicle speed of the bicycle 100 rises over the vehicle speed V4 at the intersection A and the target power reaches the lower limit value Pe.

The initial target calculation unit 34 may change the range R2 of the target power (see FIG. 8) based on the output signal of the load sensor 51. For example, the initial target calculation unit 34 may change the above described lower limit value Pe based on the output signal of the load sensor 51. The load sensor 51 is, e.g., an acceleration sensor that may sense the inclination of the road surface. In this case, the initial target calculation unit 34 may change the lower limit value Pe according to the inclination of the road surface. For example, the initial target calculation unit 34 may raise the lower limit value Pe as the gradient of a rising slope is steeper. Thus, an assist suitable for the load received at walking may be obtained from the electric motor 21.

The lower limit value Pe is not necessarily changed based on the output signal of the load sensor 51. For example, when an upper limit value is determined for the target power, the upper limit value may be changed according to the load sensed based on the output signal of the load sensor 51.

The initial target calculation unit 34 does not necessarily include the temporary vehicle speed calculation part 34*a*. That is, the initial target calculation unit 34 does not necessarily use the temporary vehicle speed for calculation of the initial target power. In this case, the initial target calculation unit 34 may calculate a value defined as the initial target power in advance. The value is stored in the memory device 30M in advance. The target torque calculation unit 35, which will be described later, may calculate the target torque based on the initial target power and the motor rotation speed in the initial period ΔTi.

In this case, the initial target calculation unit 34 may change the initial target power based on the output signal of the load sensor 51. For example, when the load sensor 51 is, e.g., an inclination sensor (acceleration sensor) that may sense the inclination of the road surface, the initial target calculation unit 34 may change the initial target power according to the inclination of the road surface. For example, the initial target calculation unit 34 may increase the initial target power as the gradient of a rising slope is steeper. Thus, an assist suitable for the load received at walking may be obtained from the electric motor 21.

The target torque calculation unit 35 calculates the torque (target torque) that should be output by the electric motor from the target power (including the initial target power) calculated by the target calculation unit 33 or the initial target calculation unit 34. Specifically, the target torque calculation unit 35 calculates the target torque based on the target power and the motor rotation speed calculated based on the output signal of the motor rotation sensor 42. The target torque is obtained by, e.g., division of the target power by the motor rotation speed.

Note that, as shown in (e) of FIG. 6, at the end time (t1) of the initial period ΔTi, when the vehicle speed used in the calculation of the target power changes from the temporary vehicle speed to the vehicle speed calculated by the vehicle speed calculation unit 32, the target power may largely vary. The target torque calculation unit 35 may execute filtering processing on the target torque to suppress an abrupt change of the torque caused by such an abrupt change of the target power. That is, the target torque calculation unit 35 may change the target torque with a predefined time constant. As a result, as shown in (f) of FIG. 6, in a period Δt2 after the end of the initial period ΔTi, the target torque may be gently changed.

The period determination unit 31 determines whether or not the present time is in a period in which the initial target power should be calculated, in other words, a period in which the temporary vehicle speed should be used (the initial period ΔTi shown in FIG. 6). For example, the period determination unit 31 determines whether or not the change gear ratio calculated by the gear ratio calculation part 32*a* is stored in the memory device 30M. When the change gear ratio is not stored in the memory device 30M, the period determination unit 31 determines that the present time remains in the initial period ΔTi. On the other hand, when the change gear ratio is stored in a memory area, the period determination unit 31 determines that the initial period ΔTi has already elapsed.

The controller 30 records the time to receive the output signal (pulse signal) of the vehicle speed sensor 43 in a memory area defined in advance when receiving the walk command, and updates data recorded in the memory area at each time to receive the output signal (pulse signal) of the vehicle speed sensor 43. When the processing is performed, the period determination unit 31 may determine whether or not two pieces of data (data on two times to receive the pulse signal) is recorded in the memory device 30M. Then, when the two pieces of data is not yet recorded in the memory, the period determination unit 31 may determine that the present time is in the initial period ΔTi. On the other hand, when the two pieces of data is recorded in the memory area, the period determination unit 31 may determine that the initial period ΔTi has already elapsed.

Note that the period determination unit 31 may determine whether or not the change gear ratio immediately before the controller 30 receives the walk command is recorded in the memory device 30M. When the change gear ratio is recorded in the memory device 30M, the period determination unit 31 may determine that the initial period ΔTi has already ended at the start of the walk command. Then, the vehicle speed calculation unit 32 and the target calculation unit 33 may start processing (calculation of the vehicle speed, etc.) to perform immediately after receiving the walk command.

Figure 9A:
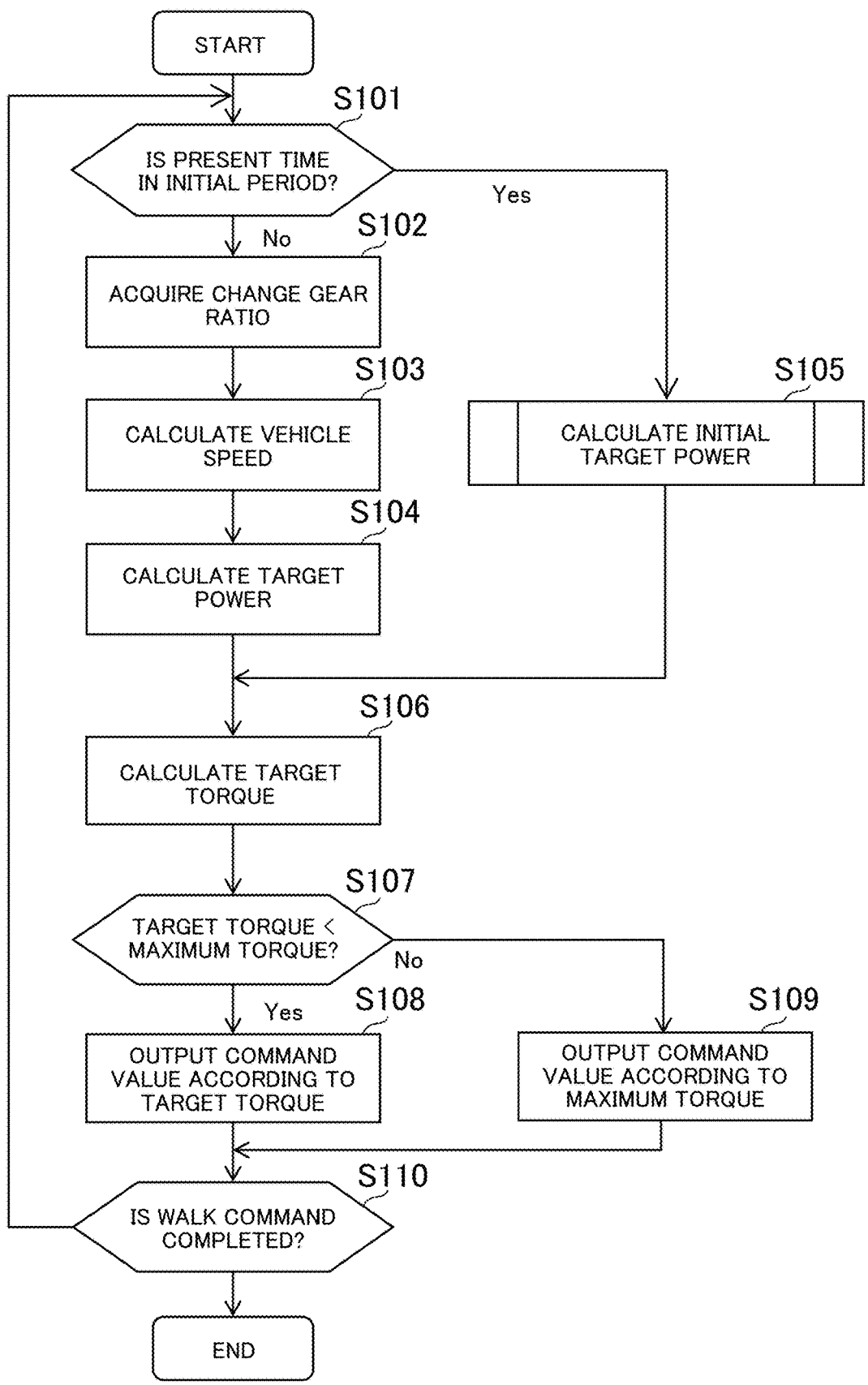
FIG. 9A is a flowchart for explanation of a flow of processing executed by the controller.
Figure 9B:
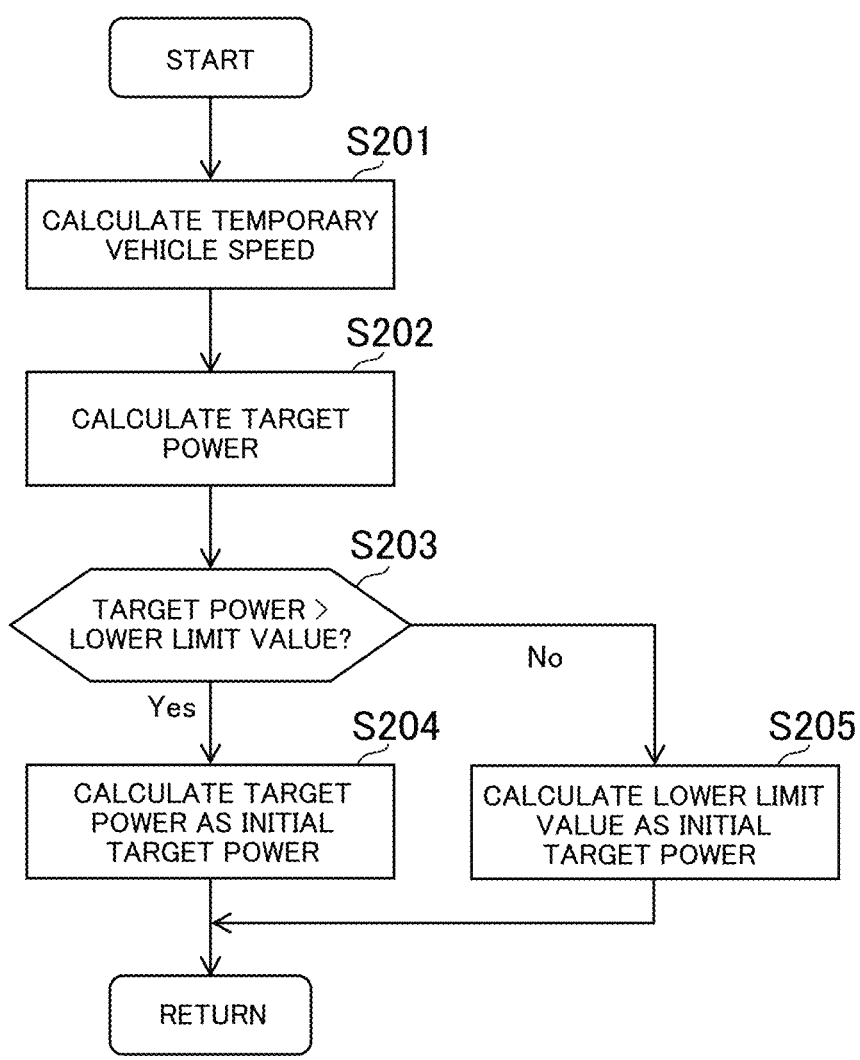
FIG. 9B is a flowchart for explanation of a flow of calculation processing of initial target power shown in FIG. 9A.

FIGS. 9A and 9B are flowcharts showing examples of flows of processing executed by the controller 30. The processing is started when the walk command is input from the switch 58 to the controller 30.

When the walk command is input to the controller 30, the period determination unit 31 determines whether or not the present time is in the initial period ΔTi (S101). When the present time is in the initial period ΔTi, processing for calculation of the initial target power (S105) is executed by the initial target calculation unit 34.

On the other hand, if the initial period ΔTi has already elapsed, the vehicle speed calculation unit 32 acquires the change gear ratio. Specifically, the change gear ratio calculation part 32a calculates the change gear ratio of the change gear mechanism 27 based on the output signal of the vehicle speed sensor 43 and the output signal of the motor rotation sensor 42 and records the calculated change gear ratio in the memory device 30M at the time when the output signal (pulse signal) of the vehicle speed sensor 43 is acquired. The change gear ratio calculation part 32a updates the change gear ratio recorded in the memory device 30M at each time to calculate the change gear ratio. The vehicle speed calculation unit 32 refers to the latest change gear ratio recorded in the memory device 30M at step S102. Then, the vehicle speed calculation unit 32 calculates the vehicle speed based on the acquired change gear ratio and the output signal of the motor rotation sensor 42 (specifically, the motor rotation speed) (S103). The vehicle speed is calculated at the higher frequency than the frequency at which the change gear ratio is updated. The target calculation unit 33 calculates the target power corresponding to the calculated vehicle speed with reference to the basic information (target power map, see FIG. 5) (S104).

The target torque calculation unit 35 calculates the target torque of the electric motor 21 based on the calculated target power and the motor rotation speed (S106). The controller determines whether or not the calculated target torque is smaller than the maximum torque defined for the electric motor 21 in advance (S107). When the target torque is smaller than the maximum torque, the controller 30 outputs a command value (e.g., a current command value) according to the target torque to the motor driver 39 (S108). On the other hand, when the target torque is not smaller than the maximum torque, the controller 30 outputs a command value according to the maximum torque to the motor driver (S109). Then, the controller 30 determines whether or not the walk command is completed (S110). For example, the controller 30 determines whether or not the walk switch 58 is turned off. When the walk command is completed, the controller 30 ends the series of processing relating to walking. On the other hand, when the walk command is not yet completed, the controller 30 returns to S101 and executes the subsequent processing again.

In the processing at S101, when the present time is in the initial period ΔTi, the controller 30 executes the processing for calculation of the initial target power (S105). Specifically, as shown in FIG. 9B, the initial target calculation unit 34 calculates the temporary vehicle speed (S201). As described above, the temporary vehicle speed is calculated based on the predefined temporary change gear ratio (e.g., the change gear ratio of the top gear) and the motor rotation speed. Then, the initial target calculation unit 34 calculates the target power corresponding to the calculated temporary vehicle speed with reference to the basic information (target power map) (S202). The initial target calculation unit 34 determines whether or not the calculated target power is larger than the lower limit value Pe (see FIG. 8) (S203). When the target power is larger than the lower limit value, the initial target calculation unit 34 calculates the target power as the initial target power (S204). On the other hand, when the target power is not larger than the lower limit value, the initial target calculation unit 34 calculates the lower limit value as the initial target power (S205). The target torque calculation unit 35 calculates the target torque based on the calculated initial target power and the motor rotation speed (S106, see FIG. 9A). Then, the controller 30 executes the processing at S106 and the subsequent steps.

As described above, the bicycle 100 includes the change gear mechanism 27 in the power transmission path, the rotation sensor 42 to output the signal according to the rotation speed of the mechanism at the upstream of the change gear mechanism 27 in the power transmission path, the vehicle speed sensor 43 to output the signal according to the rotation speed of the front wheel 9 or the rear wheel 6, the operator 58 to receive the walk command, and the controller 30 to drive the electric motor 21 when receiving the walk command. The controller 30 is configured or programmed to include the vehicle speed calculation unit 32 to calculate the change gear ratio of the change gear mechanism 27 in response to the acquisition of the output signal of the vehicle speed sensor 43, based on the output signal of the vehicle speed sensor 43 and the output signal of the rotation sensor 42, and calculate the vehicle speed based on the calculated change gear ratio and the output signal of the rotation sensor 42 at the higher frequency than the frequency of the acquisition of the output signal of the vehicle speed sensor 43, the initial target calculation unit 34 to calculate the target power without using the output signal of the vehicle speed sensor 43 in the prescribed period ΔTi from the start of walking, when the walk command is received, and the target calculation unit 33 to calculate the target power based on the vehicle speed calculated by the vehicle speed calculation unit 32 after the lapse of the prescribed period ΔTi. According to the configuration, the structure of the vehicle speed sensor 43 may be simplified (for example, the number of magnets attached to the wheel may be reduced) and a dedicated sensor to sense the change gear ratio is not necessary, and thus a cost increase of the bicycle may be avoided. Further, the target power is set from the start of walking, and thus walking may be smoothly started.

As described above, the drive system 10 includes the electric motor 21, the vehicle speed sensor 43 to output the signal according to the rotation speed of the front wheel 9 or the rear wheel 6, the rotation sensor 42 to output the signal according to the rotation speed of the mechanism at the upstream of the change gear mechanism 27 in the power transmission path for transmission of the rotation of the electric motor 21 and the rotation of the pedal 2a to the rear wheel 6, and the controller 30 to drive the electric motor 21 when receiving the walk command. The vehicle speed calculation unit 32 of the controller 30 calculates the change gear ratio of the change gear mechanism 27 in response to the acquisition of the output signal of the vehicle speed sensor 43, based on the output signal of the vehicle speed sensor 43 and based on the output signal of the rotation sensor 42, and calculates the vehicle speed based on the calculated change gear ratio and the output signal of the rotation sensor 42 at the higher frequency than the frequency of the acquisition of the output signal of the vehicle speed sensor 43. When the walk command is received, the initial target calculation unit 34 calculates the target power without using the output signal of the vehicle speed sensor 43 in the prescribed period ΔTi from the start of walking. Target calculation unit 33 calculates the target power based on the vehicle speed calculated by the vehicle speed calculation unit 32 after the lapse of the prescribed period ΔTi. According to the configuration, the structure of the vehicle speed sensor 43 may be simplified and a dedicated sensor to sense the change gear ratio is not necessary, and thus a cost increase of the bicycle may be avoided. Further, the target power is calculated from the start of walking, and thus walking may be smoothly started.

The initial target calculation unit 34 may calculate the target power based on the temporary vehicle speed different from the vehicle speed calculated by the vehicle speed calculation unit 32.

In the memory device 30M, the target power map in which the target power of the electric motor 21 is defined in advance according to the vehicle speed is stored. The target calculation unit 33 calculates the target power based on the vehicle speed calculated by the vehicle speed calculation unit 32 with reference to the target power map, and the initial target calculation unit 34 calculates the target power of the electric motor 21 in the narrower range R2 (see FIG. 8) than the range R1 (see FIG. 8) of the target power defined in the target power map. According to the configuration, an assist in the appropriate range may be obtained from the electric motor 21 in the prescribed period from the start of walking.

The initial target calculation unit 34 may calculate the target power of the electric motor 21 in the range R2 having the higher lower limit value Pe than the lower limit value (zero) of the target power defined in the target power map. According to the configuration, when a calculation that makes the target power lower is used in the prescribed period from the start of walking, the assist by the electric motor 21 may be prevented from being excessively small.

The bicycle 100 includes the load sensor 51 that senses the load on the bicycle 100. The initial target calculation unit 34 may change the range of the target power according to the load sensed by the load sensor 51. According to the configuration, assist according to the load may be obtained from the electric motor 21.

The initial target calculation unit 34 may calculate the temporary vehicle speed based on the predetermined temporary change gear ratio and the output signal of the rotation sensor 42.

The predetermined temporary change gear ratio may be the maximum (the change gear ratio of the top gear) of the change gear ratios that can be set by the change gear mechanism 27. According to the configuration, the target power is calculated on the assumption that the vehicle speed is higher, and thus, the target power of the electric motor may be set to be lower.

When the target power calculated based on the temporary vehicle speed is lower than a predetermined lower limit value, the initial target calculation unit 34 may set the predetermined lower limit value as the initial target power. According to the configuration, assist by the electric motor 21 may be prevented from being excessively small in the prescribed period ΔTi from the start of walking.

The initial target calculation unit 34 may calculate a predetermined value as the target power in the prescribed period ΔTi. According to the configuration, the calculation of the target power may be simplified.

The initial target calculation unit 34 may change the predetermined value set as the target power according to the load sensed by the load sensor 51 in the prescribed period ΔTi. The assist according to the load may be obtained from the electric motor.

The vehicle speed sensor 43 may have the magnet (sensed portion) rotating according to the rotation of the rear wheel 6 or the front wheel 9 and the sensor main body 43a that outputs the signal in response to coming of the magnet. The prescribed period ΔTi may be a period from the start of walking to output of the second pulse signal by the sensor main body.

The target value of the electric motor 21 is the target value for the power. According to the configuration, after the lapse of the prescribed period ΔTi, the rear wheel 6 is driven with torque necessary for keeping the walking speed of the user regardless of the change gear ratio of the change gear mechanism 27.

A method of controlling the bicycle 100 includes calculating the change gear ratio of the change gear mechanism 27 in response to the acquisition of the output signal according to the rotation speed of the front wheel 9 or the rear wheel 6 from the vehicle speed sensor 43, based on the output signal of the rotation sensor 42 to sense the rotation speed of the mechanism at the upstream of the change gear mechanism 27 and the output signal of the vehicle speed sensor 43, calculating the vehicle speed based on the calculated change gear ratio and the output signal of the rotation sensor 42 at the higher frequency than the frequency of the acquisition of the output signal of the vehicle speed sensor 43, calculating the target power without using the output signal of the vehicle speed sensor 43 in the prescribed period ΔTi from the start of walking, and calculating the target power based on the calculated vehicle speed after the lapse of the prescribed period ΔTi.

According to the method, the structure of the vehicle speed sensor 43 may be simplified and a dedicated sensor to sense the change gear ratio is not necessary, and thus a cost increase of the bicycle may be avoided. Further, the target power is calculated from the start of walking, and thus walking may be smoothly started.

The bicycle 100 includes the change gear mechanism 27 in the power transmission path, the rotation sensor 42 to output the signal according to the rotation speed of the mechanism at the upstream of the change gear mechanism 27 in the power transmission path, the vehicle speed sensor 43 to output the signal according to the rotation speed of the front wheel 9 or the rear wheel 6, the operator 58 to receive the walk command, and the controller 30 to drive the electric motor 21 when receiving the walk command. The vehicle speed calculation unit 32 of the controller 30 calculates the change gear ratio of the change gear mechanism 27 in response to the acquisition of the output signal of the vehicle speed sensor 43, based on the output signal of the vehicle speed sensor 43 and the output signal of the rotation sensor 42, and calculates the vehicle speed based on the calculated change gear ratio and the output signal of the rotation sensor 42 at the higher frequency than the frequency of the acquisition of the output signal of the vehicle speed sensor 43. The initial target calculation unit 34 calculates the target power based on the temporary vehicle speed different from the vehicle speed calculated by the vehicle speed calculation unit 32 in the initial period ΔTi from the start of walking. The target calculation unit calculates the target power based on the vehicle speed calculated by the vehicle speed calculation unit 32 after the lapse of the prescribed period ΔTi. According to the configuration, the structure of the vehicle speed sensor 43 may be simplified and a dedicated sensor to sense the change gear ratio is not necessary, and thus a cost increase of the bicycle may be avoided. Further, the target power is calculated from the start of walking, and thus walking may be smoothly started.

The drive system 10 includes the electric motor 21, the vehicle speed sensor 43 to output the signal according to the rotation speed of the front wheel 9 or the rear wheel 6, the rotation sensor 42 to output the signal according to the rotation speed of the mechanism at the upstream of the change gear mechanism 27 in the power transmission path for transmission of the rotation of the electric motor 21 and the rotation of the pedal 2a to the rear wheel 6, and the controller 30 to drive the electric motor 21 when receiving the walk command. The vehicle speed calculation unit 32 of the controller 30 calculates the change gear ratio of the change gear mechanism 27 in response to the acquisition of the output signal of the vehicle speed sensor 43, based on the output signal of the vehicle speed sensor 43 and the output signal of the rotation sensor 42, and calculates the vehicle speed based on the calculated change gear ratio and the output signal of the rotation sensor 42 at the higher frequency than the frequency of the acquisition of the output signal of the vehicle speed sensor 43. When the walk command is received, the initial target calculation unit 34 calculates the target power based on the temporary vehicle speed different from the vehicle speed calculated by the vehicle speed calculation unit 32 in the prescribed period ΔTi from the start of walking, and then, calculates the target power based on the vehicle speed calculated by the vehicle speed calculation unit 32 after the lapse of the prescribed period ΔTi. According to the configuration, the structure of the vehicle speed sensor 43 may be simplified and a dedicated sensor to sense the change gear ratio is not necessary, and thus a cost increase of the bicycle may be avoided. Further, the target power is calculated from the start of walking, and thus walking may be smoothly started.

A method of controlling the bicycle 100 includes calculating the change gear ratio of the change gear mechanism 27 in response to the acquisition of the output signal according to the rotation speed of the front wheel 9 or the rear wheel 6 from the vehicle speed sensor 43, based on the output signal of the rotation sensor 42 to sense the rotation speed of the mechanism at the upstream of the change gear mechanism 27 and the output signal of the vehicle speed sensor 43, calculating the vehicle speed based on the calculated change gear ratio and the output signal of the rotation sensor 42 at the higher frequency than the frequency of the acquisition of the output signal of the vehicle speed sensor 43, calculating the target power based on the temporary vehicle speed different from the vehicle speed calculated based on the calculated change gear ratio and the output signal of the rotation sensor 42 in the prescribed period ΔTi from the start of walking, and calculating the target power based on the vehicle speed based on the calculated change gear ratio and the output signal of the rotation sensor 42 after the lapse of the prescribed period ΔTi. According to the method, the structure of the vehicle speed sensor 43 may be simplified and a dedicated sensor to sense the change gear ratio is not necessary, and thus a cost increase of the bicycle may be avoided. Further, the target power is calculated from the start of walking, and thus walking may be smoothly started.

Note that the electric assisted bicycle proposed in the present disclosure is not limited to the above described bicycle 100.

For example, in the bicycle 100, the target power is calculated as the target value to drive the electric motor 21. However, the target value to drive the electric motor 21 may be a target value for torque. In this case, in place of the target power map, a map that associates the target torque with the vehicle speed may be stored in the memory device 30M. Further, in this map, the vehicle speed may be associated with the target torque for the respective plurality of gear change levels. The target calculation unit 33 may calculate torque corresponding to the vehicle speed calculated in the vehicle speed calculation unit 32 and the change gear ratio as the target torque with reference to the map. The initial target calculation unit 34 may calculate torque corresponding to the temporary change gear ratio and the temporary vehicle speed with reference to the map.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A drive system of an electric assisted bicycle, the drive system comprising:
an electric motor;
a vehicle speed sensor to output a signal according to a rotation speed of a front wheel or a rear wheel;
a rotation sensor to output a signal according to a rotation speed of a mechanism upstream of a change gear mechanism in a power transmission path to transmit rotation of the electric motor and rotation of a pedal to the rear wheel; and
a controller to drive the electric motor when receiving a walk command; wherein
the controller is configured or programmed to include:
a vehicle speed calculator to calculate a change gear ratio of the change gear mechanism in response to acquisition of the output signal of the vehicle speed sensor, based on the output signal of the vehicle speed sensor and the output signal of the rotation sensor, and calculate a vehicle speed based on the calculated change gear ratio and the output signal of the rotation sensor at a higher frequency than a frequency of the acquisition of the output signal of the vehicle speed sensor;
an initial target calculator to calculate a target value to drive the electric motor without using the output signal of the vehicle speed sensor in a prescribed period from start of walking, when the walk command is received; and
a target calculator to calculate the target value to drive the electric motor based on the vehicle speed calculated by the vehicle speed calculator after a lapse of the prescribed period.

2. The drive system according to claim 1, wherein the initial target calculator is configured or programmed to calculate the target value to drive the electric motor based on a temporary vehicle speed different from the vehicle speed calculated by the vehicle speed calculator.

3. The drive system according to claim 1, further comprising a memory including information that defines the target value of the electric motor according to the vehicle speed in advance, wherein
the target calculator is configured or programmed to calculate the target value to drive the electric motor based on the vehicle speed calculated by the vehicle speed calculator with reference to the information; and
the initial target calculator is configured or programmed to calculate the target value to drive the electric motor in a narrower range than a range of the target value defined in the information.

4. The drive system according to claim 3, wherein the initial target calculator is configured or programmed to calculate the target value to drive the electric motor in a range with a lower limit value higher than a lower limit value of the target value defined in the information.

5. The drive system according to claim 3, further comprising a load sensor to sense a load on the bicycle, wherein
the initial target calculator is configured or programmed to change the range of the target value according to the load sensed by the load sensor.

6. The drive system according to claim 2, wherein the initial target calculator is configured or programmed to calculate the temporary vehicle speed based on a predetermined temporary change gear ratio and the output signal of the rotation sensor.

7. The drive system according to claim 6, wherein the predetermined temporary change gear ratio is a maximum of change gear ratios that are able to be set by the change gear mechanism.

8. The drive system according to claim 7, wherein, when the target value to drive the electric motor calculated based on the temporary vehicle speed is lower than a prescribed lower limit value, the initial target calculator is configured or programmed to set the prescribed lower limit value as the target value.

9. The drive system according to claim 1, wherein the initial target calculator is configured or programmed to calculate a predetermined value as the target value to drive the electric motor in the prescribed period.

10. The drive system according to claim 9, further comprising a load sensor to sense a load on the bicycle, wherein
the initial target calculator is configured or programmed to change the predetermined value according to the load sensed by the load sensor in the prescribed period.

11. The drive system according to claim 1, wherein
the vehicle speed sensor includes a sensed portion to rotate according to rotation of the rear wheel or the front wheel and a sensor main body to output a signal in response to coming of the sensed portion; and
the prescribed period is a period from the start of walking to output of a second signal by the sensor main body.

12. The drive system according to claim 1, wherein the target value to drive the electric motor is a target power of the electric motor.

13. A method of controlling an electric assisted bicycle, the method comprising:
calculating a change gear ratio of a change gear mechanism in response to acquisition of an output signal from a vehicle speed sensor, based on an output signal of a rotation sensor to sense a rotation speed of a mechanism upstream of the change gear mechanism and based on the output signal of the vehicle speed sensor according to a rotation speed of a front wheel or a rear wheel;
calculating a vehicle speed based on the calculated change gear ratio and the output signal of the rotation sensor at a higher frequency than a frequency of the acquisition of the output signal of the vehicle speed sensor;
calculating a target value to drive of an electric motor without using the output signal of the vehicle speed sensor in a prescribed period from start of walking; and
calculating the target value to drive the electric motor based on the calculated vehicle speed after a lapse of the prescribed period.

14. A drive system of an electric assisted bicycle, the drive system comprising:
an electric motor;
a vehicle speed sensor to output a signal according to a rotation speed of a front wheel or a rear wheel;
a rotation sensor to output a signal according to a rotation speed of a mechanism upstream of a change gear mechanism in a power transmission path to transmit rotation of the electric motor and rotation of a pedal to the rear wheel; and
a controller to drive the electric motor when receiving a walk command; wherein
the controller is configured or programmed to include:
a vehicle speed calculator to calculate a change gear ratio of the change gear mechanism in response to acquisition of the output signal of the vehicle speed sensor, based on the output signal of the vehicle speed sensor and based on the output signal of the rotation sensor, and calculate a vehicle speed based on the calculated change gear ratio and the output signal of the rotation sensor at a higher frequency than a frequency of the acquisition of the output signal of the vehicle speed sensor;
an initial target calculator to calculate a target value to drive the electric motor based on a temporary vehicle speed different from the vehicle speed calculated by the vehicle speed calculator in a prescribed period from start of walking, when the walk command is received; and
a target calculator to calculate the target value to drive the electric motor based on the vehicle speed calculated by the vehicle speed calculator after a lapse of the prescribed period.

15. A method of controlling an electric assisted bicycle, the method comprising:
calculating a change gear ratio of a change gear mechanism in response to acquisition of an output signal from a vehicle speed sensor, based on an output signal of a rotation sensor to sense a rotation speed of a mechanism upstream of the change gear mechanism and based on the output signal of the vehicle speed sensor according to a rotation speed of a front wheel or a rear wheel;
calculating a vehicle speed based on the calculated change gear ratio and the output signal of the rotation sensor at a higher frequency than a frequency of the acquisition of the output signal of the vehicle speed sensor;
calculating a target value to drive of an electric motor based on a temporary vehicle speed different from the vehicle speed calculated based on the calculated change gear ratio and the output signal of the rotation sensor in a prescribed period from start of walking; and
calculating the target value to drive the electric motor based on the vehicle speed calculated based on the calculated change gear ratio and the output signal of the rotation sensor after a lapse of the prescribed period.

* * * * *